Oct. 26, 1926.                                                                 1,604,298
                         H. NEITZEL
                          LOCK NUT
                       Filed June 3, 1926
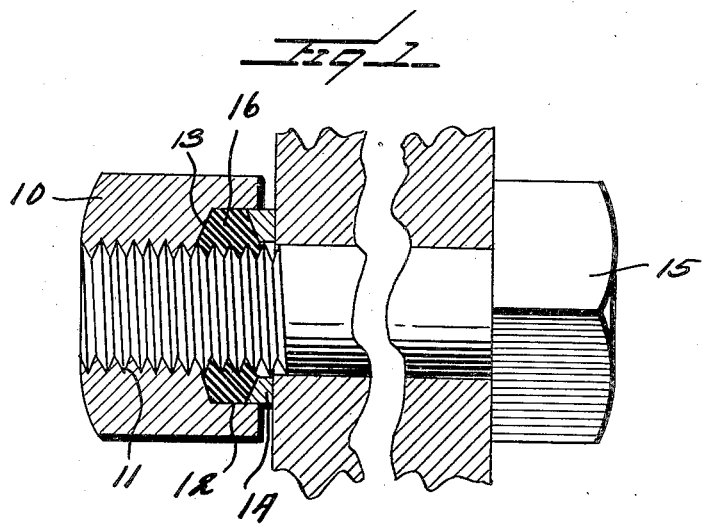
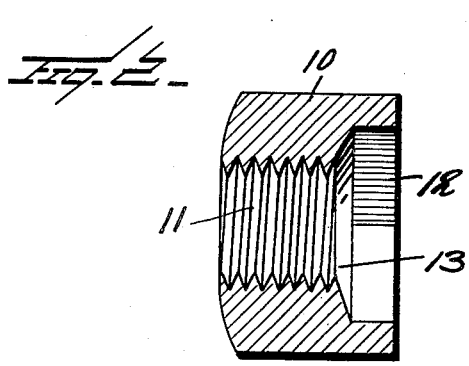  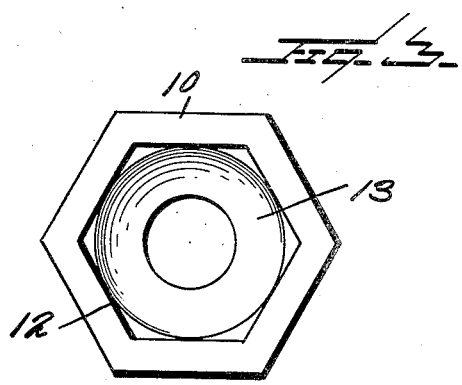
  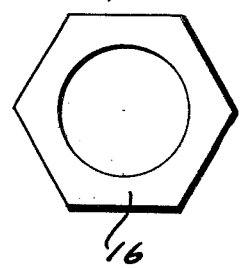    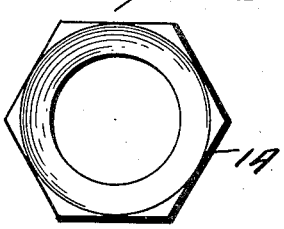
Inventor
H. Neitzel
By Watson E. Coleman
    Attorney Patented Oct. 26, 1926.

1,604,298

UNITED STATES PATENT OFFICE.

HERMAN NEITZEL, OF LIVINGSTON, MONTANA.

LOCK NUT.

Application filed June 3, 1926. Serial No. 113,526.

This invention relates to lock nuts and the general object of the invention is to provide a lock nut so designed that any vibration given to the bolt will not tend to jar off the nut.

A further object is to provide a device of this character which includes a hollow nut and gasket of yielding material disposed within the nut and a metallic washer so designed as to compress the gasket and cause the threads of the bolt to bite into the gasket.

My invention is illustrated in the accompanying drawings wherein:—

Figure 1 is a sectional view through a lock nut constructed in accordance with my invention;

Fig. 2 is a sectional view of the nut proper;

Fig. 3 is an end elevation looking toward the recessed end of the nut;

Fig. 4 is a sectional view through the metallic washer;

Fig. 5 is a face view thereof;

Fig. 6 is a plan view of the gasket;

Fig. 7 is a sectional view of the gasket.

Referring to these drawings it will be seen that the nut 10 is screw-threaded for the greater part of its length as at 11, but that the base of the nut has an enlarged aperture 12 which is many sided, this aperture being shown as hexagonal. This enlarged portion 12 is connected to the screw-threaded bore by a concaved or inclined face 13.

Coacting with the nut 10 and adapted to be disposed in the enlarged portion 12 is a metallic washer 14 which is also many sided so as to fit the enlarged portion 12 and which is shown as hexagonal. This washer has a central aperture for the passage of the bolt and through which the bolt 15 loosely passes. A gasket 16 of flexible material such as leather is formed to fit within the enlarged portion 12 so as to be rotated with the nut when the nut is rotated, and this gasket is disposed against the beveled face 13 and is engaged by a concaved face or beveled face of the washer 14. While I have illustrated the nut as hexagonal it is to be understood that it might have any desired form but that the recess or portion 12 must be many sided, that the washer must be many sided, and that the gasket must have the same form so as to cause the gasket to turn with the nut.

The principle of this device resides in overcoming the vibration of the nut and the bolt by a leather or fibrous gasket which acts as a cushion and prevents the nut from backing off. With the construction illustrated, when the nut is screwed down in place, the leather or fibrous gasket will be forced into the threads of the bolt. Inasmuch as this gasket has a hole through it of less diameter than the bolt, the bolt will cut its own thread through the gasket. It is to be particularly noted that the gasket and the washer rotate with the nut and must do so. If the gasket is so formed that it cannot rotate with the nut, no threads are cut in the gasket and only the pressure of the nut or shell 10 upon the gasket acts to force the gasket into the threads of the bolt. This force or pressure alone is not sufficient to force the gasket into the threads unless the gasket be formed of rubber or like material. In this case, the gasket will not resist vibration and if the gasket be round the nut will work off. With my invention the gasket is forced to turn onto the bolt with the nut, thus cutting threads through the center of the gasket, giving it at once a firm seat upon the bolt. In addition to this the gasket is subjected to pressure from all sides and the concave metal washer exerts a pressure upon the outer surface of the gasket, insuring a firm seat for the nut as a whole.

The internal diameter of the gasket 16 depends upon the size of the bolt and the number of threads to the inch. Thus, for a one-half inch bolt having thirteen threads to the inch, the depth of the threads is about $\frac{1}{16}''$ and so the internal diameter of the gasket should be about $\frac{1}{16}''$ smaller than the diameter of the bolt or, in other words, the gasket should have an internal diameter less than the diameter of the bolt by an amount equal to the depth of the threads.

I claim:—

A lock nut of the character described having a central screw-threaded bore and a recess at one end larger than the bore and many sided, a gasket of fibrous material disposed within said recess and fitting the many sides of the recess, the central aperture through the gasket being smaller than the screw-threaded bore of the nut, and a many sided metallic washer disposed within the recess and bearing against the gasket, the inner end of said recess between the wall of the recess and the screw-threaded bore of the nut being beveled, and that face of the washer confronting the gasket being beveled centrally and outwardly.

In testimony whereof I hereunto affix my signature.

HERMAN NEITZEL.